United States Patent [19]
von Holdt

[11] 4,289,468
[45] Sep. 15, 1981

[54] HYDROSTATIC MOLD GATE

[76] Inventor: John W. von Holdt, 6864 Lexington La., Niles, Ill. 60648

[21] Appl. No.: 33,905

[22] Filed: Apr. 27, 1979

[51] Int. Cl.³ .............................................. B29F 1/05
[52] U.S. Cl. .................... 425/146; 425/549; 425/566; 425/572
[58] Field of Search .............. 425/146, 563, 564, 549, 425/572, 566

[56] References Cited

U.S. PATENT DOCUMENTS

| | | | |
|---|---|---|---|
| 3,010,156 | 11/1961 | Smith | 425/146 |
| 3,164,863 | 1/1965 | Hunt | 425/146 X |
| 3,344,477 | 10/1967 | Stokis | 425/564 X |

OTHER PUBLICATIONS

D—M—E Auto-Shut Probe, Brochure of D—M—E Company, Detroit, Michigan.

*Primary Examiner*—Thomas P. Pavelko
*Attorney, Agent, or Firm*—Charles F. Pigott, Jr.; Garrettson Ellis

[57] ABSTRACT

A gate for a mold comprises a molding compound inlet conduit for communication of molding compound to the mold cavity. A plunger member is slidably mounted adjacent the inlet conduit and adapted to prevent flow through the conduit in a first sliding position and to permit flow through the conduit in a second sliding position. The plunger defines a slidable shaft and an enlarged end proportioned to prevent the flow through the conduit in the first position. The enlarged end defines a mold cavity-facing surface of larger area than the opposed surface on the enlarged end, which opposed surface communicates with the conduit. Accordingly, pressurized molding compound presses against the opposed surface, to spontaneously open the plunger into a second sliding position to admit molding compound to the mold cavity. Upon essential equalization of the pressures in the mold cavity at the conduit, the plunger is spontaneously moved hydrostatically to its first closed sliding position.

16 Claims, 10 Drawing Figures

HYDROSTATIC MOLD GATE

BACKGROUND OF THE INVENTION

In complex molding technology, the mold gates which are used to control the flow of molding compound into a mold chamber may be controlled by pressure and temperature sensors. If desired, computer-operated adjustment of the gates may be utilized by a feedback loop from the pressure and temperature sensors to the control gates. However, for many purposes, such a system has been found to have insufficient sensitivity, while being excessively complex.

Another problem of mold gating which is commonly encountered in the various structures of the prior art is gate freeze, in which the molding compound obstructs the gate.

When a very small gate is used in order to obtain better control of the flow, undesirable levels of material shear and gate stresses can occur, which can actually degrade or decompose the molding material, due to the tremendous kinetic forces applied on the material as it is forced through the gate.

Similarly, other problems which are encountered in molding may include material suck-back through a gate which stays open too long, or gate drool. Also, the problem of balancing multiple gates in a molding process so that desired flows pass through each of them can be a major technical problem.

In accordance with this invention, all of the above problems can be greatly reduced or eliminated by means of the hydrostatic gate of this invention, which operates spontaneously in a pressure-sensitive manner to permit the flow of molding compound into the mold chamber through a relatively wide orifice, to avoid the undesirable shear and stresses on the molding compound. At the same time, the gate shuts off quickly and spontaneously when the back pressure in the mold chamber essentially equals the pressure in the molding compound inlet conduit, for high speed injection molding.

Similarly, should the pressure equalization merely be transient for any reason, for example, shrinkage in the mold or the need for "packing out" the mold, the hydrostatic gate of this invention can spontaneously re-open to provide further molding compound to the chamber. The result of this is a major improvement in molding technology, with the elimination of multiple technical problems in a wide variety of molding operations, including complex multiple gate molding operations.

DESCRIPTION OF THE INVENTION

In accordance with this invention, a gate for a mold is provided which comprises a molding compound inlet conduit defining an outer end for communication with a source of molding compound, and an inner end for communication with a mold cavity or chamber.

A plunger member is slidably mounted adjacent the molding compound inlet conduit, and adapted to prevent flow through the conduit in a first sliding position, and to permit flow through the conduit in any of several second sliding positions.

The plunger defines a shaft, slidably positioned in a receptacle, and further defines an enlarged end proportioned to prevent the flow through the conduit in the first position. The enlarged end defines a mold cavity-facing surface which is of larger area than the surface of the enlarged end opposed to the mold chamber. This is generally accomplished by the presence of the shaft communicating with the enlarged end at the opposed surface, which can render the opposed surface of substantially less area than the cavity-facing surface. The opposed surface also communicates with the molding compound inlet conduit, to enter into pressurized engagement with molding compound in the conduit.

As a result of this, the relatively pressurized molding compound in the conduit, compared with the pressure in the mold chamber, causes the plunger to spontaneously open into one of the second sliding positions by the action of pressure on the opposed surface, allowing molding compound to flow into the mold chamber.

However, when substantial equalization of the pressures in the mold chamber and the conduit takes place, the plunger is spontaneously closed to its first sliding position, preventing the passage of molding compound either to or from the mold chamber. This is accomplished because, as stated above, the mold chamber-facing surface has a larger area than the opposed surface of the enlarged end of the plunger. Accordingly, essential equalization of pressure of the inlet conduit and the mold chamber causes an unbalanced force to be exerted against the plunger, forcing it into its first, closed position.

As an added advantage of this invention, as the pressure in the mold cavity or chamber begins to approach essential equalization with the pressure in the inlet conduit, the plunger moves toward a closed position, resulting in a relatively gradual decrease of flow, ultimately ending in a complete shut-off. This permits molding compound to enter into small recesses and the like where a relatively low flow rate will be encountered, without resulting in an absolute shut-off in the mold gate. Instead, the gate of this invention provides exactly the amount of pressurized molding compound which is necessary to fill the mold chamber, and then shuts off at the precise moment of essential pressure equalization. This precision is often unattainable by other means known to the prior art, and is of great advantage, for example, to provide automatically balanced multiple mold systems.

The performance characteristics of the mold gate of this invention can be adjusted as desired by the simple adjustment of the dimensions of the plunger member of this invention.

The shut-off pressure conditions, for example, may be easily adjusted by the relative adjustment of the areas of the chamber-facing surface and the opposed surface of the enlarged end, coupled with the adjustment of the diameter of the shaft.

Furthermore, the plunger may optionally define a retention ear defining a surface shaped to provide sufficient sliding area against the wall of the receptacle to prevent tilting of the plunger member during operation.

Referring to the drawings.

Figure 1:
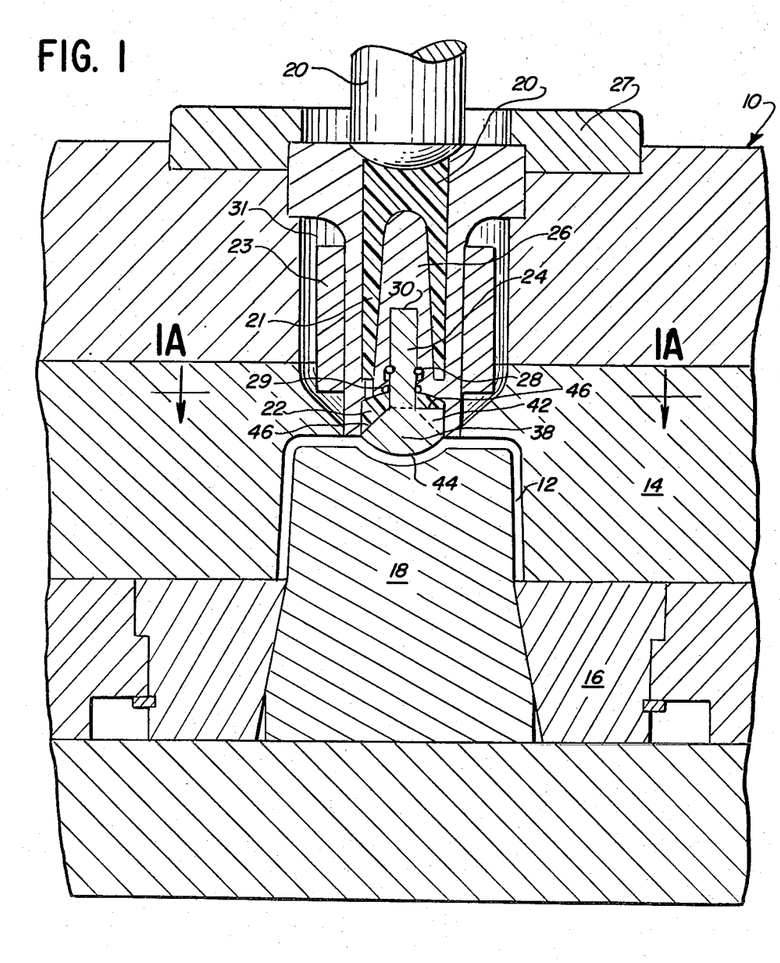
FIG. 1 is a longitudinal sectional view of a portion of a mold system for a container, utilizing the hydrostatically-operated gate valve of this invention, taken along line 1—1 of FIG. 1A.
Figure 1A:
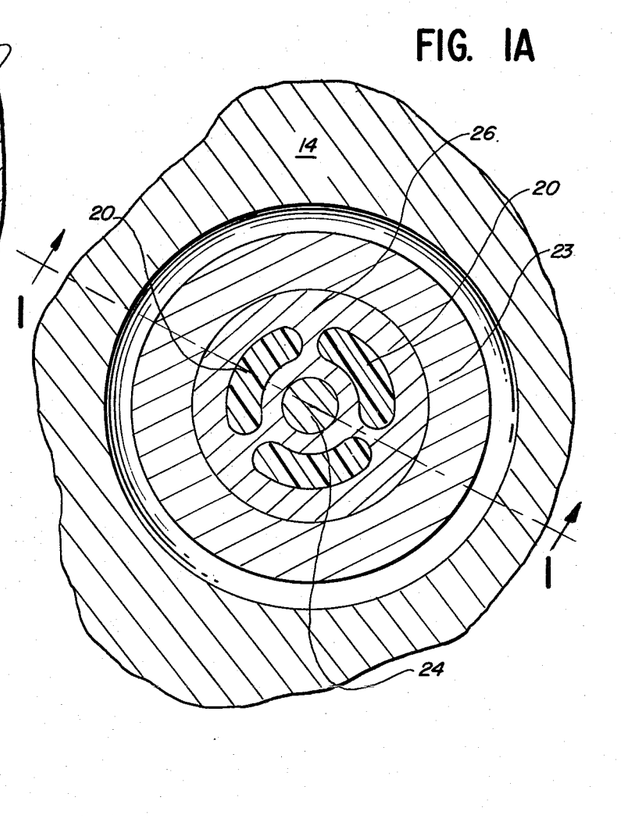
FIG. 1A is a sectional view taken along line 1a—1a of FIG. 1.

Referring to FIGS. 1 and 1A, a mold 10 is disclosed, specifically shown for producing a cup-shaped container in a mold cavity or chamber 12, although it is contemplated that any shape of mold cavity can be utilized in accordance with this invention for producing any molded object.

As is conventional, the mold 10 comprises a pair of retractable mold halves 14, 16 of generally conventional design, and including a mold core 18 for defining one wall of the mold cavity or chamber 12.

One of the mold halves 14 defines a molding compound inlet conduit 20 including a tubular conduit portion 21, and having an inner end 22 for communication with mold chamber 12, as well as communicating with a source of plastic molding compound for feeding through conduit 20 to mold chamber 12. Heater 23 surrounds part of conduit 20 to keep the molding compound hot and fluid.

In accordance with this invention, plunger member 24 is slidably mounted in a sleeve member 26, which is shown in FIG. 1 to define both a portion 20, and a receptacle for plunger 24. Sleeve member 26 is, in turn, held in mold half 14 by retainer piece 27, with sleeve 26 occupying aperture 31.

O-ring 29 is shown to optionally provide hermetic sealing to the upper end 30 of plunger 24, with plunger 24 being slidable in the sleeve member 26. Snap ring 28 retains plunger 24 in sleeve member 26.

Figure 2:
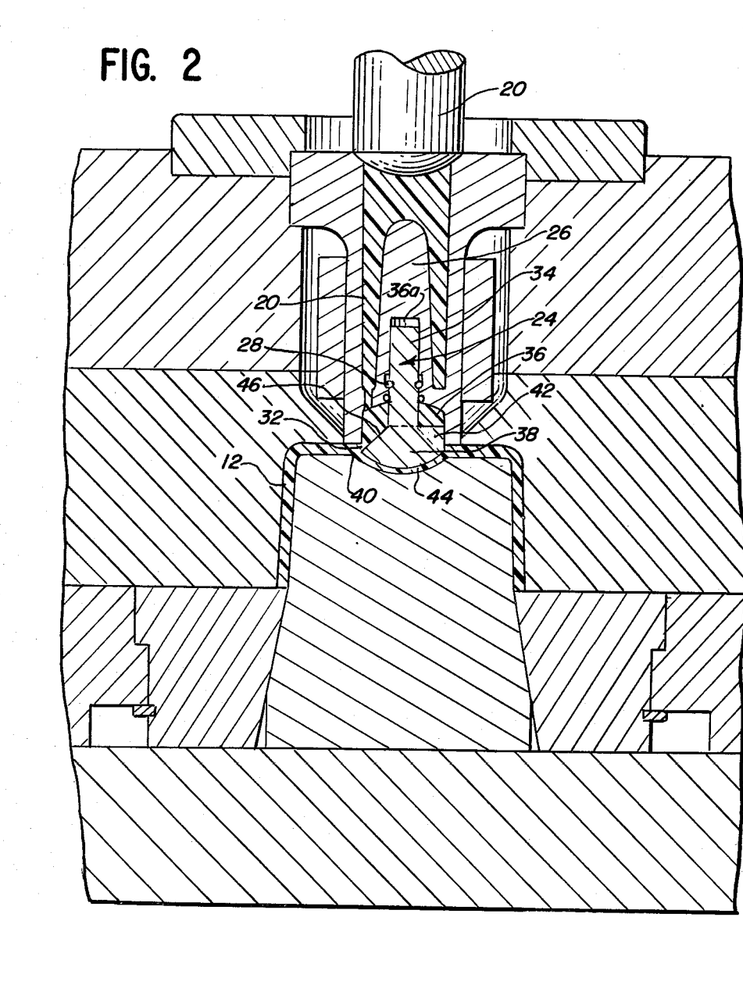
FIG. 2 is a sectional view similar to FIG. 1, showing the gate of this invention in an open position to allow molding compound to flow into the mold cavity or chamber.

Plunger 24 is adapted to prevent flow through conduit 20 in a first sliding position in sleeve member 26, as shown in FIG. 1. However, plunger 24 can move to any of several second sliding positions, as shown in FIG. 2, in which flow is permitted through an open space 32 between conduit 20 and mold cavity 12.

As shown, plunger 24 defines a shaft 34 positioned in the receptacle 36 defined in the sleeve member 26. Plunger 24 also defines an enlarged end 38, defining a generally annular periphery 40 which is proportioned as shown to prevent flow through the conduit in the first position. The space 32 created to permit the flow of molding compound between conduit 20 and mold cavity 12 in any of the second positions as exemplified by FIG. 2 may be annular, or, in the specific embodiment shown, may comprise the majority of a segment of a circle defined adjacent edge 40, with the exception of the area occluded by retention ear 42. Ear 42 defines a surface shaped to provide sufficient sliding area against the wall of receptacle 36 to prevent tilting of the plunger member during operation. Retention ear 42 typically occupies approximately 10 to 30 percent of the circumference of edge 40, although its use is optional.

The remainder of circumference of edge 40 is capable of separation from the wall of receptacle 36, to define the arcuate space 32 in the shape of essentially a three quarter circle, for example, when ear 42 is used, and a fully annular space when ear 42 is not used.

Enlarged end 38 defines a surface 44 which faces mold chamber 12, and which is of larger transverse cross-sectional area, perpendicular to the axis of plunger 24, than the surface 46 of the enlarged end 38 which is opposed to mold chamber 12, and which communicates with conduit 20, occupying the space of receptacle 36 and facing the inner end 22 of conduit 20.

As the result of this, relatively pressurized molding compound in conduit 20 causes plunger 24 to spontaneously open into a second sliding position, as shown by FIG. 2, by the action of pressure on opposed surface 46, overbalancing the pressure against surface 44, and thus causing plunger 24 to move downwardly into the first position shown by FIG. 1 into a second, open position as in FIG. 2. Accordingly, molding compound from conduit 20 flows into the mold chamber as shown in FIG. 2.

Figure 3:
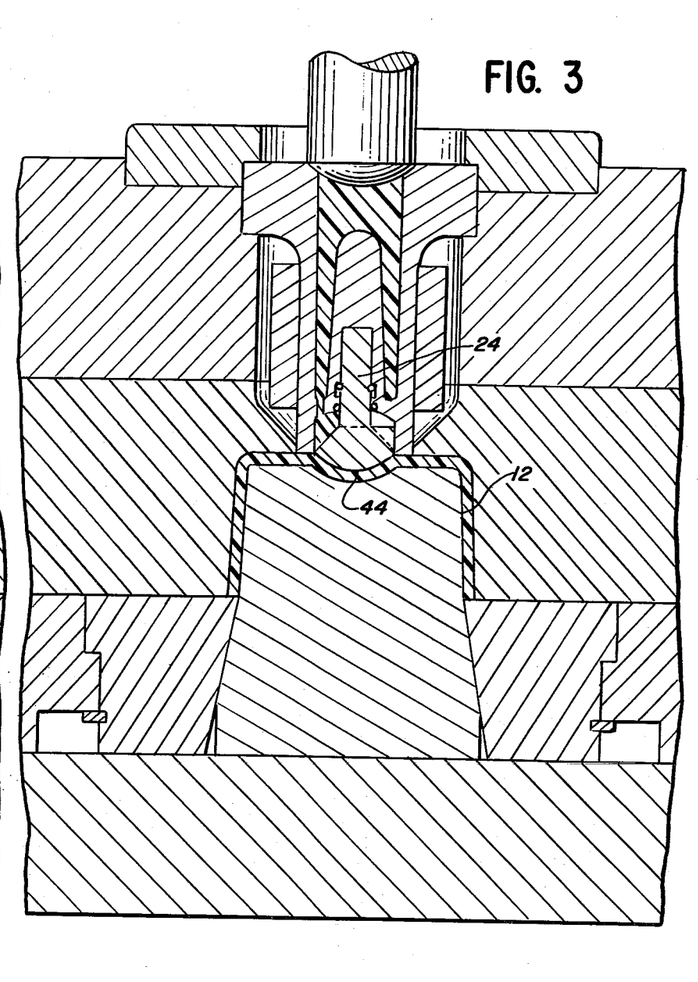
FIG. 3 is a sectional view similar to FIG. 2, showing the gate valve of this invention in shut-off condition once again, impelled by a back pressure of the molding compound in the mold cavity rising toward the pressure in the molding compound supply conduit.

When the molding compound fills chamber 12 as shown in FIG. 3, the back pressure against surface 44 of plunger 24 increases, causing plunger 24 to retract again toward its first position. The process steps between the configuration of FIGS. 2 and 3 can be gradual. Plunger 24 can spontaneously adjust itself to the circumstances of the situation, with the inflow of molding compound slowing up as plunger 24 is retracted by the build-up of back pressure in the mold cavity 12, until the back pressure builds sufficiently to close off flow altogether by the complete retraction of plunger 24 back into the first position as shown at FIG. 3.

In the event that slowly flowing mold compound moves into small subcavities of the mold chamber 12, causing the back pressure to decrease once again, plunger 24 will spontaneously open to the extent and for the amount of time necessary to cause the back pressure in mold cavity 12 to build up again to the predetermined closing level, spontaneously resulting in a high quality mold product and eliminating many of the problems encountered in previous molding operations.

Figure 4:
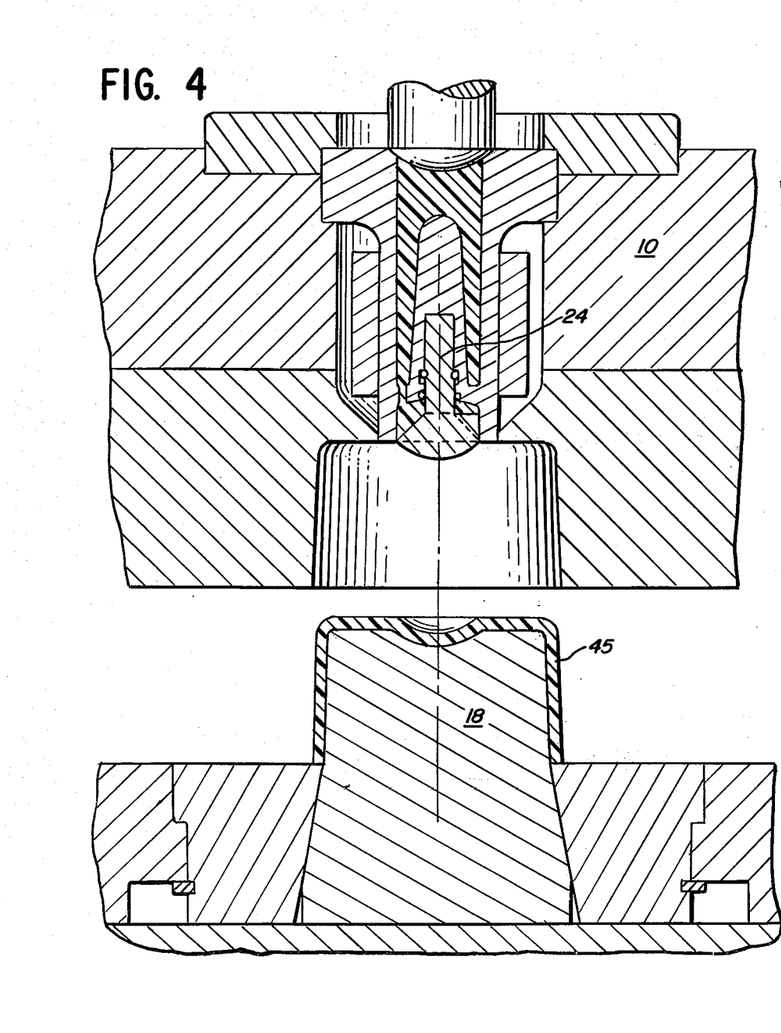
FIG. 4 is a sectional view similar to FIG. 3, but showing the mold opened for removal of the container.

When plunger 24 is in a second, open position as shown in FIG. 2, an inner space 36a of receptacle 36 is defined between the inner end of the plunger shaft 34 and the inner end of receptacle 36. Because of the presence of sealing O-ring 29, space 36a is essentially under vacuum, with the result that a bias pressure is exerted by this circumstance to cause plunger 24 to retract. In the circumstance where the pressure conditions against faces 46 and 44 are essentially equal, plunger 24 will accordingly retract. Thus, when mold 10 is opened as shown in FIG. 4, plunger 24 may remain in its retracted position. Molded part 45 may then be removed.

The above mold system, and the other embodiments disclosed herein, may have its mold chamber or chambers vented by any desired conventional means, to fit the specific circumstances.

Figure 5:
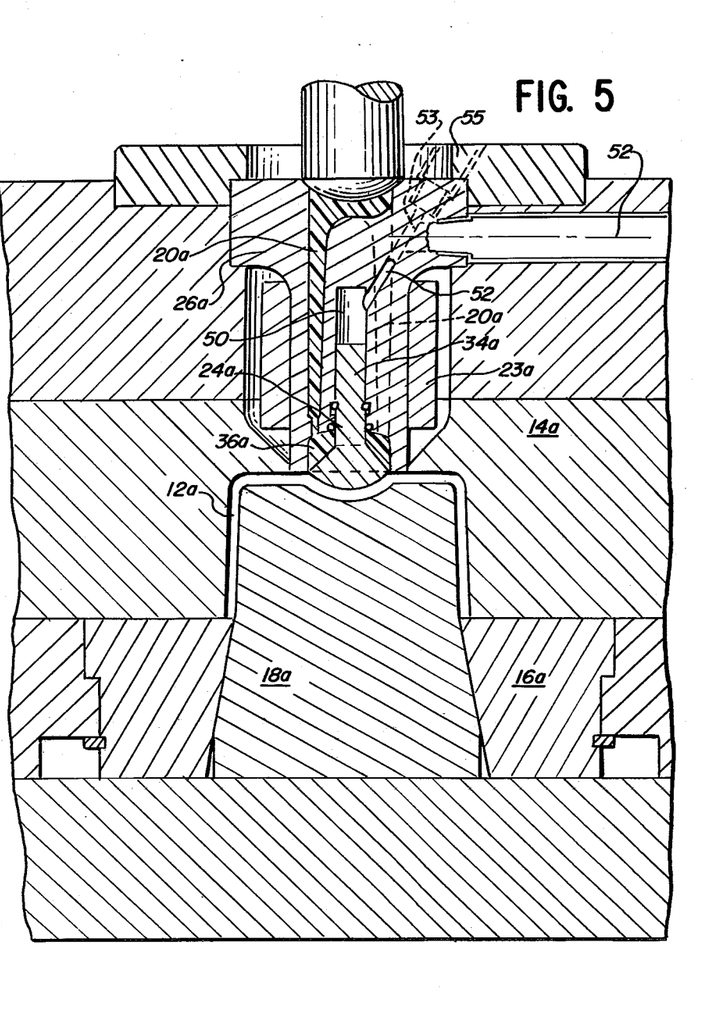
FIG. 5 is a longitudinal sectional view of a mold generally similar to that of FIG. 1, but modified as indicated.

Referring to FIG. 5, a modification of the gate valve of this invention is provided. The structure is similar to that of FIGS. 1 through 4 except as otherwise indicated, having a sleeve member 26a similar to the previously described sleeve member, and a plunger 24a for a similar purpose as previously described.

A permanent chamber 50 may be defined in the receptacle which receives the plunger shaft 34a with relative shortening of shaft 34a with respect to the receptacle 36a in which it resides. A conduit 52, openable and closable by plug 53 through port 55, communicates between the exterior and chamber 50, the outer end of conduit 52 being adapted for communication with a pressure control means.

Accordingly, the opening and closing characteristics of plunger 24a may be controlled by the adjustment of the subatmospheric or super-atmospheric pressure gas or liquid within chamber 50, being governed by the action of pressure control means.

Typically, the pressure will be generally constant during the operation of the plunger 24a, so that the actual motion of the plunger is goverened by the pressure conditions in molding compound inlet 20a as compared with the pressure conditions in molding chamber 12a. However, the pressure conditions within chamber 50 consequently can vary as desired with specific, relative pressure conditions which cause the hydrostatic gate plunger 24a of FIG. 5 to open and close. For example, a substantial positive pressure imposed by the pressure control in chamber 50 causes the plunger 24a of the gate valve to quickly open and tend to remain open longer. A sub-atmospheric pressure in chamber 50 will tend to cause plunger 24a to open less readily and to close more easily.

A positive pressure may be imparted by the pressure control during the molding operation, and a sub-atmospheric pressure may be applied as the mold is opened to hold plunger 24a in its closed position.

The remainder of the mold assembly of FIG. 5 may be generally conventional, comprising an upper mold half assembly 14a and a lower mold half assembly 16a, comprising a mold core 18a. Heater 23a is provided as in the previous embodiment.

Conduit 52 is seen to pass a solid section of sleeve 26a between two sides of the molding compound inlet conduit 20a which in this instance may define for example a seven-eighths circle in cross section.

Figure 6:
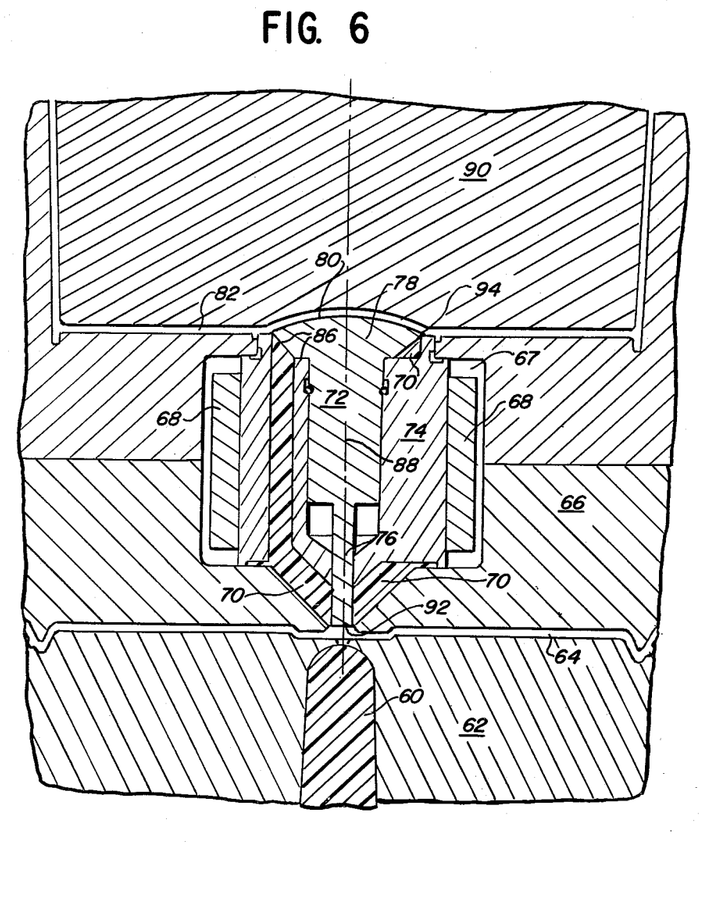
FIG. 6 is a longitudinal sectional view of a double cavity molding system utilizing the invention of this application.
Figure 7:
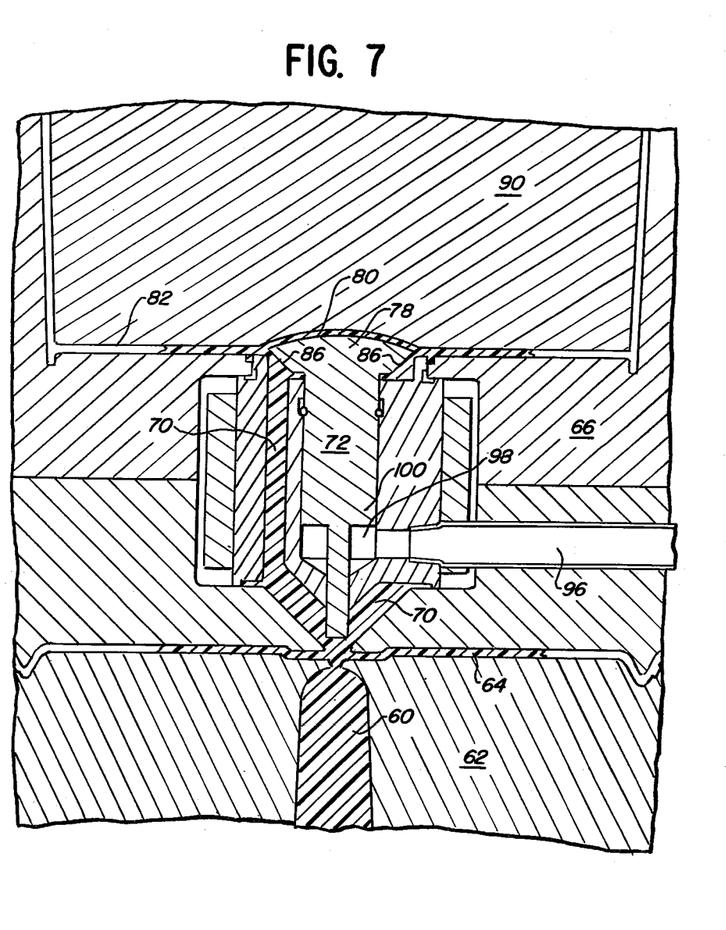
FIG. 7 is a longitudinal sectional view of the double cavity molding system of FIG. 6, shown in a later stage of operation.

Referring now to the drawings of FIGS. 6 and 7, a double cavity molding system is disclosed. Molding compound inlet conduit 60 extends through a mold section 62 to communicate with a mold cavity or chamber 64 to define, for example, a lid for a paint bucket.

Second mold section 66 is also provided, defining a chamber 67 containing a heater member 68 and a continuation 70 of the molding compound inlet conduit defined through a sleeve member 74. Plunger 72 is slidably mounted in sleeve member 74, which defines a receptacle for the plunger member 72.

Plunger 72 is slidably mounted adjacent the molding compound inlet conduit 70 and adapted to prevent flow through the conduit in a first sliding position, as shown in FIG. 6, and to permit flow through the conduit in a second sliding position, such as shown in FIG. 7.

As in the previous embodiment, plunger 72 defines a shaft 76, slidably positioned in the sleeve member 74, and an enlarged end 78, proportioned to prevent flow through the conduit in the first sliding position, as shown in FIG. 6, by sealing in two places.

As in the previous embodiment, the enlarged end 78 of the plunger 72 defines a surface 80 which faces second mold chamber 82, which is specifically shown to be in the form of a paint bucket proportioned to receive the lid made in mold chamber 64 as a closure. As in the previous embodiments, surface 80 is of larger cross sectional area than the surface of the enlarged end 86 which is opposed to the mold chamber and in communication with molding compound supply conduit 70.

It should be noted that the term "cross sectional area" implies the cross section as taken perpendicular to the longitudinal axis 88 of plunger 72. The same holds for the previous plunger designs 24, 24a, even though the actual surface area of face 86 could be theoretically larger than the surface area of face 80, if much of the surface area 86 defines only a small angle to axis 88.

A mold core 90 is utilized. As a result of this, when the various mold pieces 62, 66, and 90 are opened apart, the bucket formed in chamber 82 and the lid in chamber 64 may be removed.

The structure of FIGS. 6 and 7 may operate in the following manner.

Molding compound passes from conduit 60 into the first molding chamber 64, which may be vented in a usual manner.

When chamber 64 is filled with molding compound, the pressure builds, being exerted upon end face 92 of shaft 76 of the plunger 72, causing the plunger to move out of its first position as shown in FIG. 6, into a second position as shown in FIG. 7.

The molding compound accordingly is free to pass through conduit 70, which may essentially surround plunger 72 for maximized uniformity of flow through the molding compound inlet about the annular edge 94 of enlarged head 78. In this circumstance, the molding compound is free to pass around the enlarged head 78 into the second mold cavity 82 freely, until the pressure begins to build in cavity 82.

Then, as previously described as an inventive principle with respect to the previous embodiments, the differential pressure exerted upon face 80 over the pressure on face 86 causes the plunger 72 to retract again toward its first, closed position as shown in FIG. 6. This causes peripheral edge 94 and end face 92 to seal the molding compound flow path in two locations, thus isolating the two mold chambers.

As before, in the event of a drop in pressure due to the delayed entrance of molding compound through a small passageway or the like, plunger 72 can open again to supply more molding compound to the desired area.

This particular embodiment also makes it possible for the first mold chamber 64 to be essentially filled with molding compound prior to the beginning of filling of chamber 82 with molding compound. This advantage can be used for a major improvement in quality of product and largely failure-free molding operation.

The drawing of FIG. 7 is further modified from that of FIG. 6 to show how a pneumatic tube 96 can communicate with a space 98 defined at the rear of enlarged portion 100 of plunger 72, for communication with a pneumatic control device similar to control 54. This optional feature provides the further advantages of the embodiment of FIG. 5 to the embodiment of FIG. 7.

Figure 8:
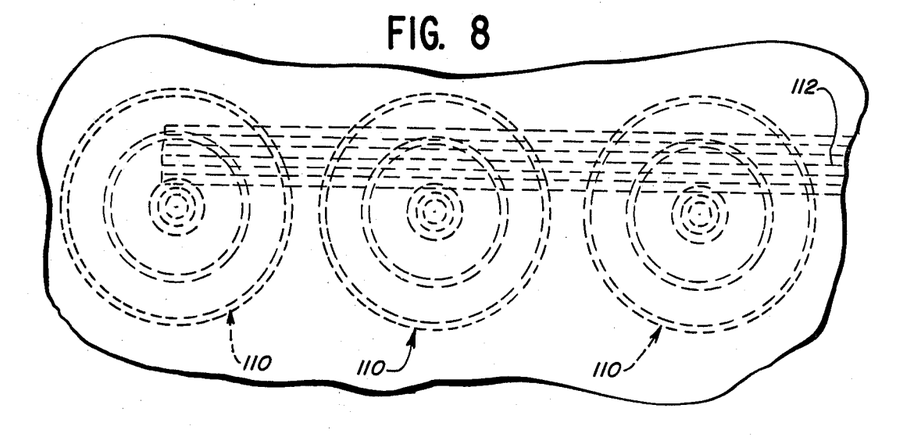
FIG. 8 is a plan view of a multiple mold system in accordance with this invention.
Figure 9:
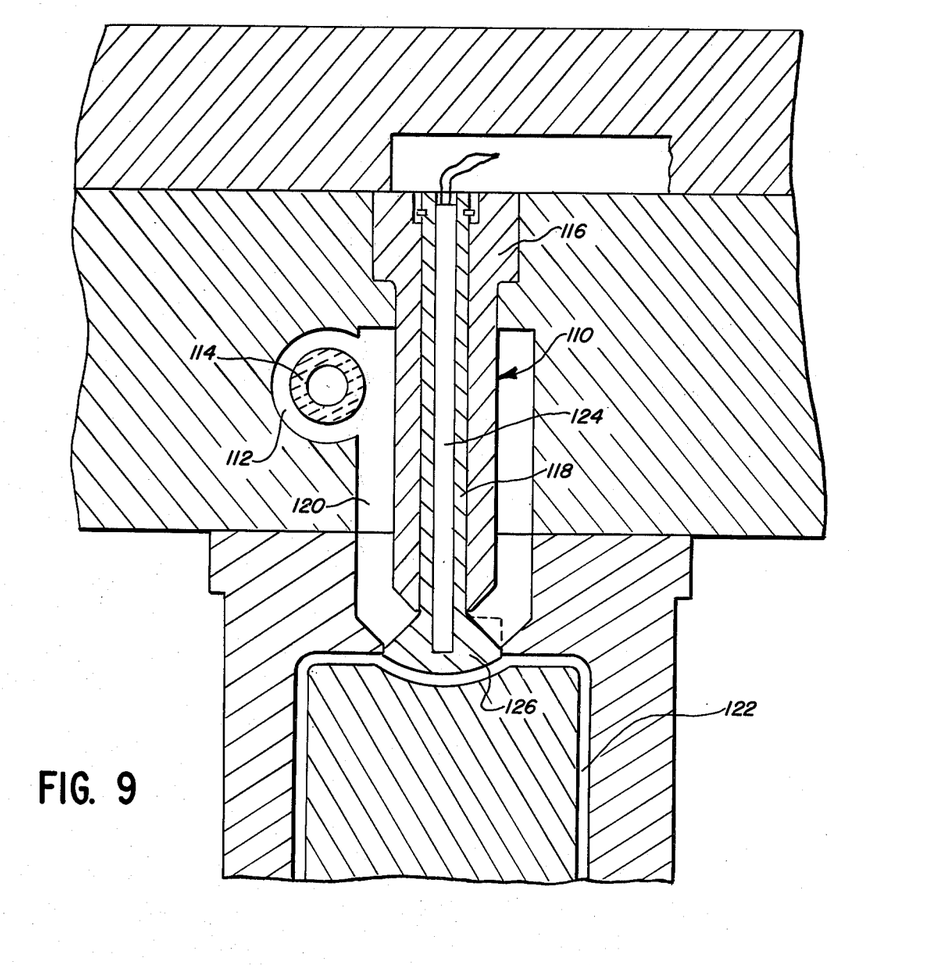
FIG. 9 is a longitudinal sectional view of a single mold assembly of the multiple mold system of FIG. 8.

Referring to FIGS. 8 and 9, three mold assemblies 110 are interconnected by a commonly molding compound inlet conduit 112.

By this invention, multiple cavity molds as shown may operate with little or no cavity variations with time-consuming and laborous balancing of the mold, since spontaneous pressure balancing is provided by the mold gate of this invention, which automatically controls the density of a molded part by spontaneously opening and closing its predetermined pressures. The mold gate of this invention accordingly can shut off even though pressure in the inlet conduit remains at its accustomed molding compound feeding pressure.

Referring to FIG. 9, molding compound inlet conduit 112 carries a longitudinally disposed heater member 114 disposed therein to keep the molding compound fluid. Sleeve 116, as in the previous embodiment, carries a plunger member 118, which is slidably mounted in a receptacle in the sleeve member 116 and is adapted to prevent flow through the branch 120 of the molding compound inlet conduit leading to mold chamber 122 in the first sliding position. As before, plunger member 118 is movable to any of a series of second sliding positions to open communication between mold chamber 122 and molding compound inlet conduit 112. Heater member 124 may be provided within plunger 118 to provide continued heating of the molding compound in branched conduit 120. Enlarged end 126 of plunger 118, similar to that of the previous embodiments, is also provided.

Accordingly, multiple cavity molds may each utilize a plunger system in accordance with this invention to spontaneously provide a balanced molding operation where the plungers close off after filling their respective mold cavities when the proper pressure conditions have been attained, indicating proper filling of the mold cavities at the predetermined density, which will be a function of the shape of the plunger 118 and the pressure in molding compound inlet conduit 112.

The above has been offered for illustrative purposes only, and is not intended to limit the invention of this application, which is as defined in the claims below.

That which is claimed is:

1. A gate for a mold which comprises, a molding compound inlet conduit defining an outer end for communication with a source of molding compound, and an inner end for communication with a mold cavity, and a plunger member slidably mounted adjacent said molding compound inlet conduit and adapted to prevent flow through said conduit in a first sliding position, and to permit flow through said conduit in second sliding positions, said plunger defining a shaft slidably positioned in a receptacle and an enlarged end proportioned to prevent said flow through the conduit in the first position, said plunger defining a mold cavity-facing surface which is of larger cross-sectional area than the surface of the plunger opposed to said mold chamber and subject to contact with pressurized molding compound in said conduit, whereby relatively pressurized molding compound in the conduit causes said plunger to spontaneously advance to open into a second sliding position by the action of pressure on said opposed surface, and essential equalization of the pressures in the mold cavity and the conduit causes said plunger to spontaneously retract to close to its first sliding position.

2. The gate of claim 1 in which said shaft slidably positioned in the receptacle is sealed, whereby an essentially evacuated space is defined in said shaft by the advancement of said plunger into a second position, to exert a bias force urging said plunger into said first position.

3. The gate of claim 1 in which said plunger defines a retention ear defining a surface shaped to provide sufficient sliding area against the wall of said receptacle to prevent tilting of the plunger member during operation.

4. The gate of claim 1 in which said shaft slidably positioned in the receptacle is sealed, and a permanent chamber is defined in the inner end of said receptacle, a conduit communicating between said permanent chamber and the exterior and adapted for connection with pressure control means for adjustment of the pressure within said permanent chamber.

5. The mold gate of claim 1 which is free of springs influencing the motion of said plunger member between the first and second sliding positions.

6. The mold gate of claim 1 in which an elongated, arcuate passageway is defined in said second sliding position between said conduit and mold cavity.

7. The gate of claim 1 in which a single sleeve member defines said receptacle for the plunger as well as the inner end of the molding compound inlet conduit.

8. The gate of claim 7 in which an annular heating member surrounds a portion of said sleeve member.

9. The mold gate of claim 1 in which said enlarged end, in its first sliding position, defines a peripheral contact area with said conduit which is essentially linear about the majority of the circumference of said enlarged end.

10. The mold gate of claim 9 in which said enlarged end defines a retention ear which contacts the conduit, said retention ear occupying essentially 10 to 30% of the circumference of said enlarged end.

11. A gate for a mold which comprises, a molding compound inlet conduit defining an outer end for communication with a source of molding compound and an inner end for communication with a second mold cavity, a plunger member slidably mounted adjacent said molding compound inlet conduit and adapted to prevent flow through said conduit in a first sliding position, and to permit flow through said conduit in a second sliding position, said plunger defining a shaft slidably positioned in a receptacle and an enlarged end proportioned to prevent said flow through the conduit in the first position, said plunger defining a second mold cavity-facing surface which is of larger cross-sectional area than the surface of the plunger opposed to said mold chamber, and subject to contact with pressurized molding compound in said conduit, whereby relatively pressurized molding compound in the conduit causes said plunger to spontaneously advance to open into a second sliding position by the action of pressure on said opposed surface, and essential equalization of the pressures in the second mold cavity and the conduit causes the plunger to spontaneously retract to close to its first sliding position, said plunger member defining a second end opposed to said enlarged end, said second end being also proportioned to prevent flow through said molding compound inlet conduit in the first position of the plunger, and further capable of permitting flow through the conduit in the second position of the plunger, a first mold cavity positioned in communication with said molding compound inlet conduit at a position upstream from said second end, whereby molding compound fills said first cavity until rising pressure against said second end of the plunger causes said plunger to move toward the second position, so that molding compound can pass further through the molding compound inlet conduit and about said enlarged end into the second mold cavity after substantial filling of the first mold cavity.

12. The mold gate of claim 11 in which said enlarged end, in its first sliding position, defines a peripheral contact area with said conduit which is essentially linear about the majority of the circumference of said enlarged end.

13. In a multiple cavity mold system, a plurality of gates, one for each mold cavity, and a molding compound inlet conduit communicating with each cavity defining an outer end for communication with a source of molding compound and an inner end for communication with each cavity, a plunger member associated with each cavity being slidably mounted adjacent said molding compound inlet conduit and adapted to prevent flow through said conduit in a first sliding position and to permit flow through said conduit in second sliding positions, said plunger defining a shaft slidably positioned in a receptacle and an enlarged end proportioned to prevent said flow through the conduit in first position, said enlarged end defining a mold cavity-facing surface which is of larger cross-sectional area than the surface of the plunger opposed to said mold cavity and subject to contact with pressurized molding compound in said conduit, whereby relatively pressurized molding compound in the conduit causes said plunger to spontaneously advance to open into a second sliding position by the action of pressure on said opposed surface, and essential equalization of the pressures in the mold cavity and the conduit causes said plunger to spontaneously retract to close to its first sliding position.

14. The mold gate of claim 13 in which said enlarged end, in its first sliding position, defines a peripheral contact area with said conduit which is essentially linear about the majority of the circumference of said enlarged end.

15. The mold gate of claim 14 which is free of springs influencing the motion of said plunger member between the first and second sliding positions.

16. The mold gate of claim 15 which is free of springs influencing the motion of said plunger member between the first and second sliding positions.

* * * * *